Figure 1:
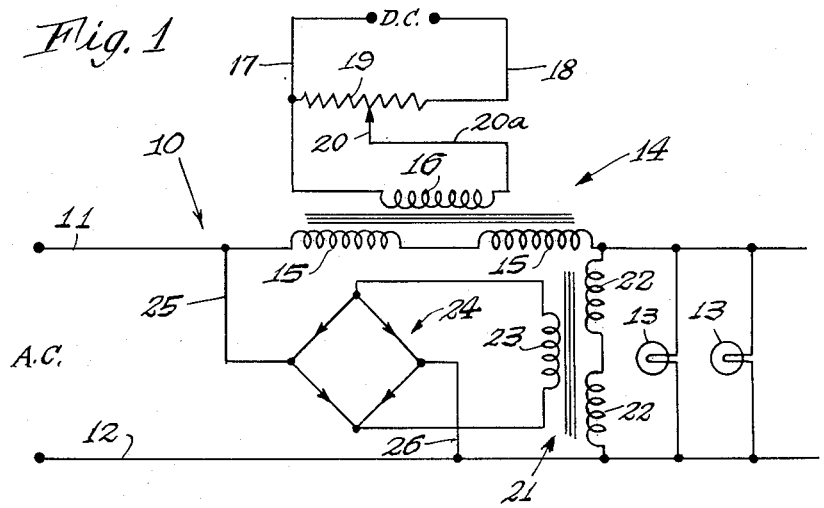

Aug. 1, 1961 L. J. G. BURSKI 2,994,815
LOAD CONTROL CIRCUIT
Filed Aug. 7, 1957

INVENTOR.
Leonard J. G. Burski
BY
Johnson and Kline
ATTORNEYS

# United States Patent Office 2,994,815
Patented Aug. 1, 1961

2,994,815
LOAD CONTROL CIRCUIT
Leonard J. G. Burski, Bristol, Conn., assignor to The Superior Electric Co., Bristol, Conn., a corporation of Connecticut
Filed Aug. 7, 1957, Ser. No. 676,890
4 Claims. (Cl. 323—8)

The present invention relates to a control circuit and more particularly to a control circuit using an adjustable impedance to control the energization of a load.

A type of variable impedance element which is commonly utilized in control circuits, is a saturable reactor because of its well-known characteristics of long life and ease of control. However, while such elements have been found generally satisfactory in achieving the desired results, when they are used to control the energization of a load which may vary between light and heavy, they have not been found completely satisfactory. This is because the size and characteristics of the saturable reactor employed follow the rule of thumb that a practical size is one in which the minimum load of which it is capable of controlling is 10% of the maximum load. Accordingly with a low energization of light loads, a practical sized reactor is incapable of controlling the current to the load since even with the reactor at its highest impedance it permits a bleed current to pass therethrough which is sufficient to cause energization of the load. Naturally a saturable reactor may be designed to provide sufficient energization at light and heavy loads but its physical dimension renders it impractical, uneconomical and prohibits the common usage thereof.

An object of the present invention is to provide a control circuit including a practical sized saturable reactor in which the circuit is capable of effectively controlling the energization of a load which is less than the heretofore accepted minimum practical amount.

Another object of the present invention is to provide in a circuit of the above type for the prevention of bleed current to the load by providing an alternate path therefor which has a relatively low impedance.

A further object of the present invention is to provide a circuit having the above noted characteristics which has an exceedingly long life, will perform its intended function and is economical.

In attaining the above objects the control circuit of the present invention is specifically described with relation to the control of illumination of stage lighting though, of course, the invention is not to be limited solely to a lamp load as it has utility with other and different loads. Thus the specific load consists of a plurality of lamps, the number in the circuit varying between one and the maximum. In order to control the light level or energization of the lamps, a saturable reactor is placed in series in the line feeding the lamps from a source of alternating current and the reactor has an adjustable D.C. control for varying its magnetization and hence its impedance. Normally, at light load levels, i.e. only a few lamps constituting the load and at the maximum impedance of the reactor, there is a bleed current through the reactor which is sufficient to light the lamps and hence prevent total blackness. This bleed current according to the present invention is directed from the load by providing an alternate path having a low impedance and hence is prevented from energizing the lights while at higher energization of the load the impedance increases, nonlinearly, to prevent excessive current flowing therethrough. This path in the specific embodiments shown includes a second saturable reactor which is positioned in parallel with the load on the load side of the first reactor. In one embodiment, the reactor has its control magnetization maintained constant while in another embodiment its control magnetization is variable and bears a relationship to the impedance of the first saturable reactor. Accordingly, at low levels of load and energization, the reactor is designed to have little resistance to the flow of current therethrough and use is made of its nonlinear impedance characteristics with constant control current in the first embodiment to limit the current flowing as the load energization increases. In the other embodiment, the control current to the reactor decreases as the voltage drop across the first reactor decreases and hence the impedance of the reactor increases at a rate which is greater than that of the first embodiment. Thus in the above described control circuit, a practical sized reactor may be employed and yet effective control of a light load at a low level of energization is assured.

Other features and advantages will hereinafter appear.

Figure 2:
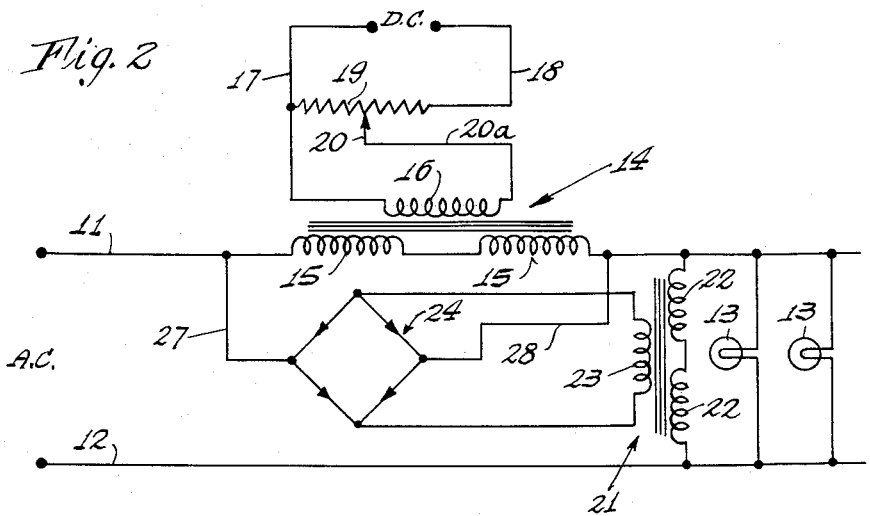
Figure 3:
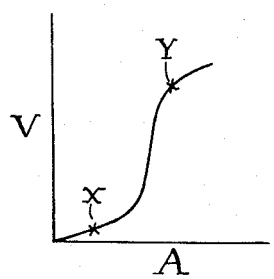
Figure 4:
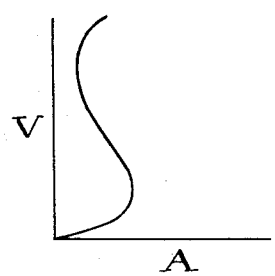

In the drawing:
FIGURE 1 is a schematic diagram of one embodiment of the control circuit of the present invention.
FIG. 2 is a schematic diagram of another embodiment.
FIG. 3 is a graph showing the volt-ampere characteristics of the saturable reactor positioned in the alternate path of the circuit of FIG. 1.
FIG. 4 is a similar graph for the reactor in the embodiment shown in FIG. 2.

Referring to FIG. 1, one embodiment of the control circuit of the present invention is indicated by the reference numeral 10 and has leads 11 and 12 which are connectible to a source of alternating current to supply the current for energizing a load. The load, in the specific embodiment shown, consists of a plurality of lamps 13 and it will be understood that the number of lamps constituting the load may vary as desired and of course instead of lamps a different type of load may be used without departing from the scope of the invention. Positioned in the lead 11 is a saturable reactor 14 having a pair of serially connecting load windings 15. The reactor 14 in addition has a control winding 16 which has one end connected to a lead 17. Another lead 18 is also provided and the leads 17 and 18 are connectible to a source of direct current to supply the control current for the reactor 14. A resistor 19 is connected between the leads 17 and 18 and a tap 20 is movable in electrical engagement on the resistor. The tap 20 is connected by a lead 20a to the other end of the control winding 16. It will be appreciated that as the tap 20 is moved, the value of the direct current through the winding 16 will vary and accordingly the impedance of the reactor 14 will vary.

With the above circuit, the size of the reactor 14 is generally determined by having its minimum impedance permitting a maximum current flow to the lamps while at its maximum impedance it is only capable of controlling a current 10% of the maximum. Thus if the load is 6000 watts, the reactor is incapable of controlling a load of less than 600 since the reactor, even at its maximum impedance, permits a bleed current to pass which is sufficient to energize a low load.

According to the present invention there is provided an alternate path for the bleed current which has a low impedance with relation to the impedance of the load. Accordingly, there is provided a second saturable reactor 21 having a pair of serially connecting load windings 22 connected across the leads 11 and 12. The connection is made between the load and the load side of the saturable reactor. The reactor 21 further includes a control winding 23 which is connected to a rectifier 24. The rectifier receives alternating current by a pair of leads 25, 26 connected to the leads 11 and 12 respectively. In the operation of the control circuit of FIG. 1, the reactor 14 is practically designed to be capable of controlling the energization of the load 13 from maximum down to approximately 10%. After 10%, a bleed current passes through the reactor but the load windings of the reactor 21 have a low impedance as compared to the load 13, so that most of the bleed current passes through the reactor 21.

Referring to FIG. 3 there is shown a characteristic curve of the reactor 21 with the voltage across the load winding being the ordinate and the abscissa being the current flowing through the winding. In order to obtain the above mentioned results, the reactor 21 is designed to have sufficient flux induced in its core by the winding 23 to provide a relatively low impedance path and hence in effect constitute a shunt when the reactor 14 is operating at its highest impedance, and such a point is indicated, for example, by the point "X" on the curve. The point "X" accordingly will be dependent upon the design characteristics of the reactor 21 which produces this point with a constant D.C. control current through the control winding 23. Thus for a small voltage across the load and also the windings 22 and since the impedance of the reactor 21 is substantially smaller than the impedance of the load, most of the current flowing past the reactor 14 will flow through or be shunted by the reactor 21 and hence will effectively prevent substantial energization of the load. As the impedance of the reactor 14 is decreased to increase the energization of the load 13, the voltage across the reactor 21 and current increases along the curve to a maximum point indicated at about "Y." However it will be appreciated that the flow of current through the load windings 22 does not increase linearly with the voltage thereacross because of the natural characteristics of a reactor having a constant value of control current and hence while the current through the reactor 22 increases, it increases at a slow rate with regard to the change of impedance of the reactor and the voltage across the load. Accordingly, at maximum energization of maximum loads there is only a slightly higher value of current through the load windings 22 than at low loads and low energization. Accordingly, this circuit enables the control of a very light load by a practically sized reactor in which a light load may be controlled below the minimum value heretofore accepted as practical.

Referring to FIG. 2, the similar elements in this embodiment are indicated by the same reference numeral as the embodiment shown in FIG. 1. The only difference between this embodiment and the embodiment shown in FIG. 1, is that the energization for the control winding 23 of the reactor 21 is not constant but is varied and related to the voltage drop across the reactor 14. To this end a pair of leads 27 and 28, which correspond to the leads 25 and 26, are connected to opposite sides of the load winding 15 of the reactor 21.

This embodiment permits the reactor 21 to function in the same manner at low levels of energization and low loads as the previous embodiment. However as the energization to the load increases, the voltage drop across the reactor 14 decreases, which decreases the energization of the control winding 23 of the reactor 21. This increases the impedance of the load windings 22 and hence as the voltage drop decreases, the impedance of the reactor 21 increases and the value of current flowing through the load windings 22 decreases. This relationship is shown graphically in FIG. 4 where the ordinate is the voltage across the load and the abscissa is the amperage through the load windings of the reactor 21. Thus at high levels of energization there is less current flowing through the reactor than at low levels.

While it may seem that the bleed path of the instant invention constitutes a waste of electrical current the components utilized herein and their relationship provide for the current through the reactor 21 to be substantially in quadrature with the source of current and hence it is not measurable by a watt-hour meter connected in the leads 11 and 12. Thus it is not charged for by an electric company.

It will be appreciated that there has been disclosed a control circuit which utilizes a saturable reactor which is practically sized for the value of load. However, in order to enable control of the load at low levels of energization and low loads, there is provided an alternate path which has a low impedance when desired and a relatively high impedance when not desired. Thus the current passing through the path at high levels of high load energization is only slightly higher than that passing through at low levels of low load energization in one embodiment while in the other, the latter is less than the former.

Variations and modifications may be made within the scope of the claims and portions of the improvements may be used without others.

I claim:

1. A control circuit for controlling the energization of a load which is adjustable between high and low values, comprising input leads connectible to a source of alternating current, a saturable reactor having load windings and a control winding with the load windings positioned in one of said input leads, said reactor having a maximum impedance which is insufficient to control low energization of low loads, means for supplying a D.C. control current to the control winding to vary the impedance of the saturable reactor, a load connected to the input leads and the load winding, connections providing an alternate device for shunting a substantial portion of the bleed current passing through the reactor at substantially its maximum impedance thereof to prevent the same from energizing the load, said path including a second saturable reactor having load windings connected between the input leads on the load side of the load windings of the first reactor, a control winding for the second saturable reactor for limiting its impedance to a value substantially lower than the impedance of the load at maximum impedance on the first reactor, and means for continually maintaining the control winding energized.

2. The invention as defined in claim 1 in which the last-named means includes connections including a rectifier across the input leads connected to the control winding of the second reactor for supplying a substantially constant control current to the control winding.

3. The invention as defined in claim 1 in which the last-named means includes connections connected to the control winding of the second reactor for supplying a control current which decreases as the impedance of the first reactor decreases.

4. The invention as defined in claim 3 in which the last-named means includes a rectifier and connections placing the rectifier in parallel with the load windings of the first reactor.

References Cited in the file of this patent
UNITED STATES PATENTS

| | | |
|---|---|---|
| 2,139,232 | Hysko | Dec. 6, 1938 |
| 2,144,289 | Hanley | Jan. 17, 1939 |
| 2,471,823 | Lang | May 31, 1949 |
| 2,675,515 | Blashfield | Apr. 13, 1954 |
| 2,821,679 | Robinson | Jan. 28, 1958 |